April 8, 1969  R. S. MUELLER  3,437,182
THROTTLE AND BRAKE CONTROL APPARATUS
Filed Oct. 25, 1966

INVENTOR
ROBERT S. MUELLER

INVENTOR
ROBERT S. MUELLER

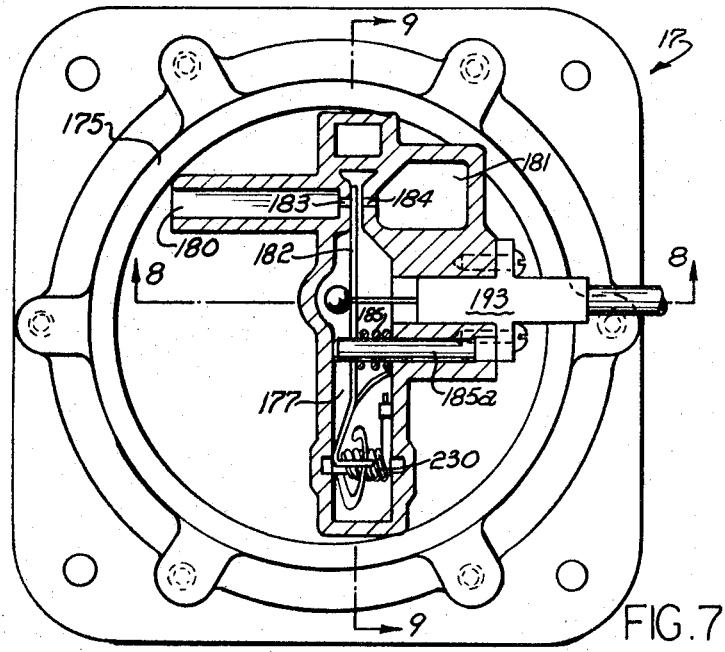

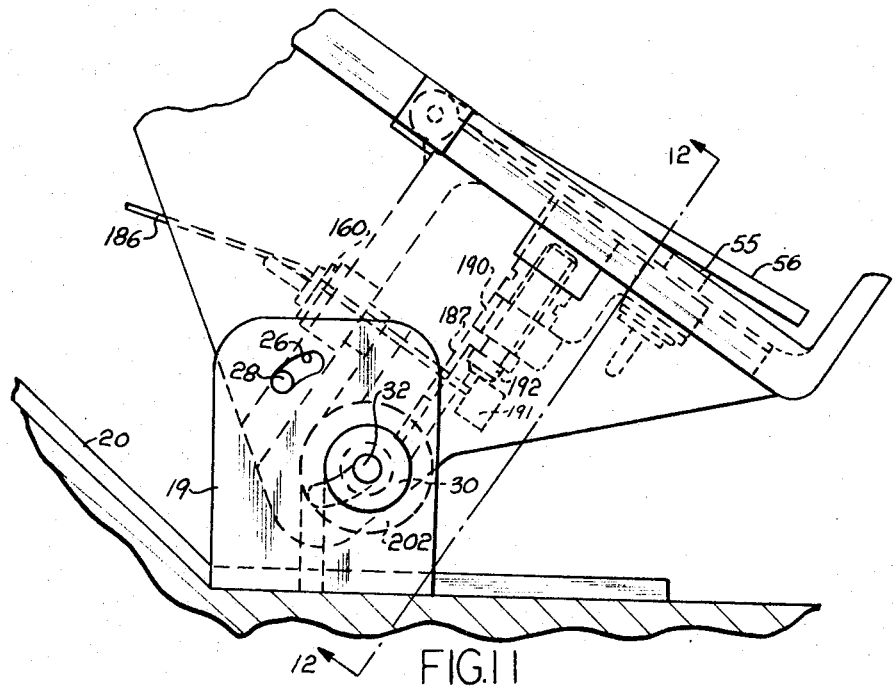
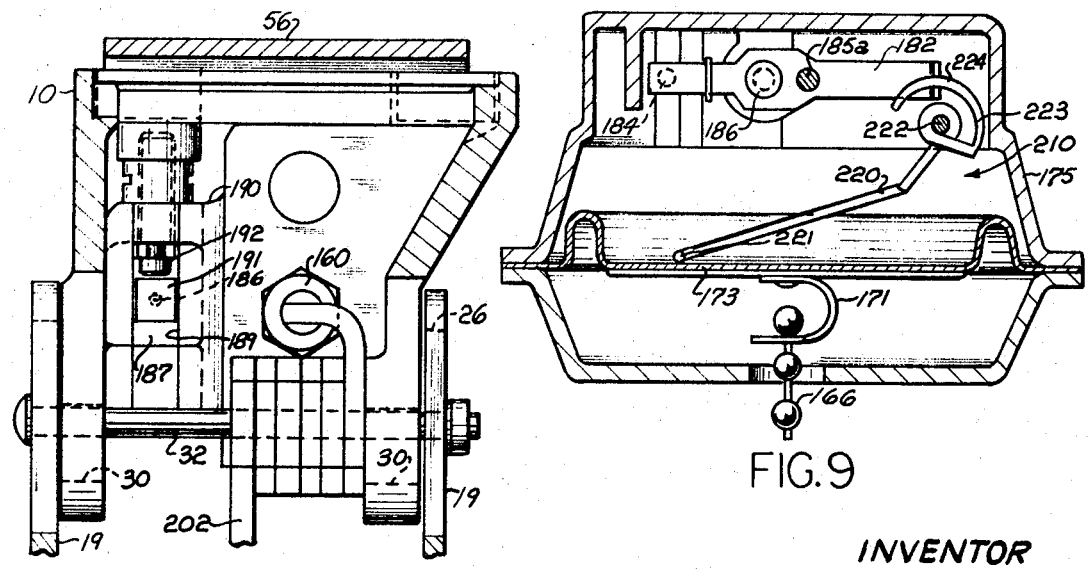

United States Patent Office 3,437,182
Patented Apr. 8, 1969

3,437,182
THROTTLE AND BRAKE CONTROL APPARATUS
Robert S. Mueller, Oak Park, Mich., assignor to Eaton Yale & Towne Inc., Cleveland, Ohio, a corporation of Ohio
Filed Oct. 25, 1966, Ser. No. 589,391
Int. Cl. F16d 67/00
U.S. Cl. 192—3
16 Claims

ABSTRACT OF THE DISCLOSURE

A speed control apparatus for moving an engine throttle member between closed and open positions comprises an actuating member. The actuating member is connected to the throttle member and is effective to move the throttle member to increase engine speed upon movement thereof. A speed governor unit is operatively connected with the throttle member and operable to maintain the engine speed at a desired value when actuated. The speed governor unit is energizable in response to movement of the actuating member in a second direction opposite to the first direction. The actuating member is also connected to engage brake means when moved in the second direction.

---

The present invention relates to control apparatus, and more particularly to speed control apparatus for an automotive vehicle in which acceleration and the maintenance of a desired speed and/or deceleration of the vehicle by braking the same are controlled by a single actuating member, preferably by an accelerator pedal.

An object of the present invention is to provide a new and improved speed control apparatus for an automotive vehicle and in which a single movable actuating member, preferably an accelerator pedal, is employed for controlling acceleration of the vehicle, actuation and de-actuation of a speed governor unit for maintaining the vehicle at or substantially at a desired operating speed and for controlling braking of the vehicle to decelerate the same.

Another object of the present invention is to provide a new and improved speed control apparatus, as defined in the preceding object, and which is of a simple and economical construction, reliable in operation, and which is so constructed and arranged that it rapidly performs the above noted speed control functions in response to movement of the actuating member or accelerator pedal in control producing directions.

Yet another object of the present invention is to provide a new and improved speed control apparatus for an automotive vehicle and in which the speed governor unit is de-actuated in response to movement of the actuating member or accelerator pedal in a direction to produce an acceleration of the vehicle to render the same ineffective to control the speed of the vehicle and actuated to maintain the speed of the vehicle substantially at a desired value in response to movement of the actuating member or accelerator pedal in a return direction opposite to the direction of its movement for producing an acceleration of the vehicle.

A further object of the present invention is to provide a new and improved speed control apparatus for an automotive vehicle in which the speed governor unit is de-actuated in response to movement of the actuating member or accelerator pedal in a direction to produce an acceleration of the speed of the vehicle and which is immediately actuated to maintain or substantially maintain the speed of the vehicle at the highest value attained during acceleraion in response to movement of the accelerator pedal in a return direction opposite to the direction of movement for producing an acceleration of the speed of the vehicle.

A still further object of the present invention is to provide a new and improved control apparatus for controlling the position of an engine throttle member movable in opposite directions between closed and opened positions to control the speed of the engine, and which includes an actuating member movable in opposite directions and operatively connected with the throttle member for moving the latter in a throttle opening direction when moved in a first direction to increase the speed of the engine and a speed governor unit operatively connected with the throttle member for maintaining the same in substantially the open position to which it was moved to maintain the speed of the engine at a desired value, and which includes means for de-actuating the speed governor unit in a response to movement of the actuating member or accelerator pedal in a direction to increase the speed of the engine and for immediately actuating the speed governor unit to maintain or substantially maintain the speed of the engine at the highest value attained in response to movement of the actuating member in a return direction opposite to the direction of movement for producing an increase of the speed of the engine.

Yet another object of the present invention is to provide a new and improved speed control apparatus of the character described above and in which the actuating member or accelerator pedal is movable in opposite directions from a neutral position and which includes means for operatively connecting the accelerator pedal to a brake actuator, preferably a brake pedal, and which is operable to effect movement of the brake actuator in a brake applying direction when the accelerator pedal is moved in a direction from the neutral position opposite to that of the direction for producing an acceleration of the vehicle.

Another object of the present invention is to provide a new and improved speed control apparatus for an automotive vehicle and which includes an actuating member or accelerator pedal movable in opposite directions from a neutral position, and means including flexible linkage means operatively connecting the accelerator pedal and a brake actuator, preferably a brake pedal, and which is operable to effect movement of the brake pedal in a brake applying direction to decelerate the speed of the vehicle in response to movement of the accelerator pedal in a direction from the neutral position opposite to its direction of movement from the neutral position for producing an acceleration of the vehicle.

A more specific object of the present invention is to provide a new and improved speed control apparatus, as defined in the next preceding object, and wherein the means for operatively connecting the accelerator pedal to the brake actuator includes a braking servo of the vacuum type which utilizes a difference in pressure on the opposite sides of an actuating member to effect movement of the actuating member which, in turn, effects movement of the brake actuator in a brake applying direction, and which is extremely rapid in operation and capable of moving the actuating member extremely quickly in response to movement of the accelerator pedal from the neutral position in a direction opposite to its direction of movement for effecting an acceleration of the vehicle.

Another object of the present invention is to provide a new and improved speed control apparatus, as defined in the next preceding object, and wherein the braking servo includes a feedback mechanism responsive to the movement of the actuating member and which is effective to decrease the pressure differential thereacross to limit the severity of the braking action applied to the vehicle.

A further object of the present invention is to provide a new and improved speed control apparatus, as defined in the preceding objects, and in which the accelerator pedal is supported by a double pivot arrangement and in which it rotates about one of its pivots when moved in a direction for producing an acceleration of the vehicle and is movable about the other of its pivots when moved in a direction for applying a braking force to the vehicle.

The present invention further resides in various novel constructions and arrangements of parts, and further objects and advantages of the present invention will be apparent to those skilled in the art to which it relates and from the following detailed description of the illustrated embodiments thereof made with reference to the accompanying drawings forming a part of this specification and in which similar reference numerals are employed to designate corresponding parts throughout the several views, and in which:

FIG. 7 is a sectional view of part of the apparatus shown in FIG. 6 and taken approximately along line 7—7 thereof;

FIG. 8 is a sectional view taken approximately along line 8—8 of FIG. 7;

FIG. 9 is a sectional view taken approximately along line 9—9 of FIG. 7;

FIG. 10 is an enlarged fragmentary sectional view of part of the apparatus shown in FIG. 7 and showing a part thereof in a different position;

FIG. 11 is a fragmentary side elevational view of part of the speed control apparatus shown in FIG. 6;

FIG. 12 is a fragmentary sectional view with portions in elevation taken approximately along line 12—12 of FIG. 11;

Figure 1:
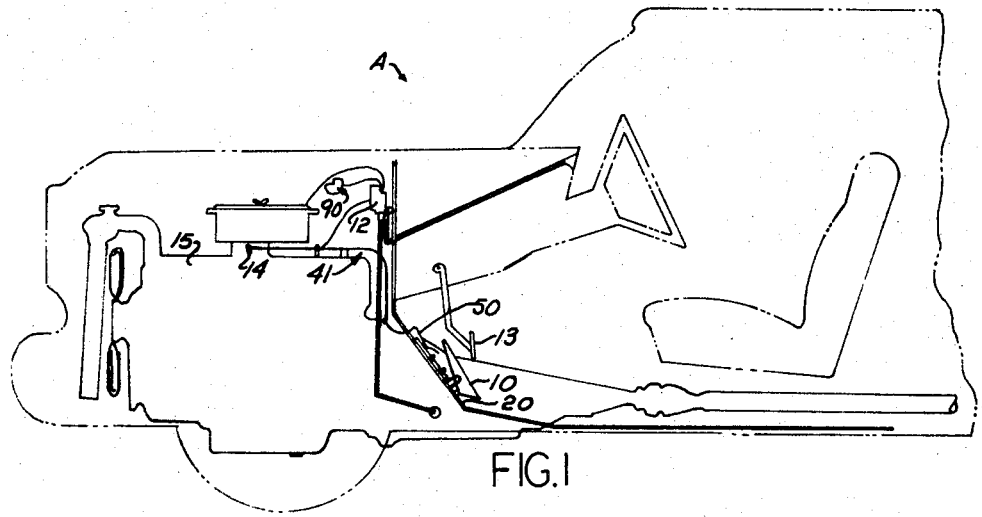
FIG. 1 is a fragmentary diagrammatic view of an automotive vehicle embodying the present invention.

Although the control apparatus of the present invention is usable for positioning and/or moving various kinds of control members for controlling specific conditions, it is particularly useful as a speed control apparatus for controlling the speed of an automotive vehicle and therefore, is herein illustrated and described as embodied in an automotive vehicle A.

In general, the speed control apparatus of the present invention utilizes an actuating member, preferably an accelerator pedal 10, for controlling the acceleration of the speed of the vehicle A, the actuation and de-actuation of a speed governor unit 12 for maintaining the speed of the vehicle A at substantially a desired value and the application of a brake actuator, herein shown as a brake pedal 13, in a brake applying direction to effect a deceleration of the vehicle. The accelerator pedal 10 is supported for movement in opposite directions from a neutral position and when moved in the first direction from the neutral position effects movement of a throttle member 14 in a throttle opening direction to increase the speed of the engine 15 and hence that of the vehicle A. Movement of the accelerator pedal 10 in this direction also functions to render the speed governor unit 12, which is operatively connected with the throttle member 14, inoperative to control the speed of the vehicle A. The accelerator pedal 10 when moved in a return direction toward its neutral position effects actuation of the speed governor unit 12 to maintain a speed of the vehicle at a desired value which, in the preferred embodiment, is the highest or substantially the highest value attained during the acceleration of the vehicle A.

Figure 2:
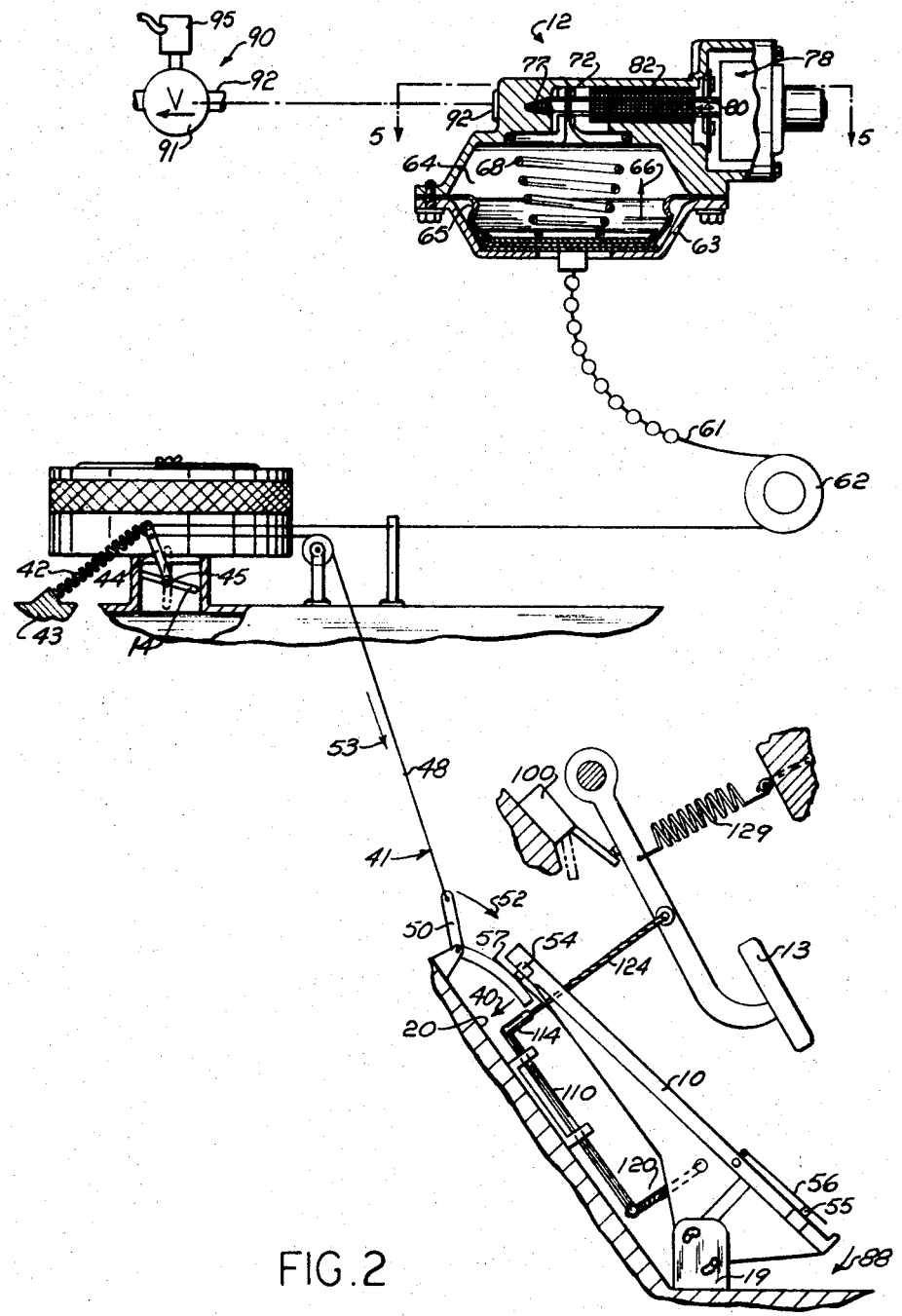
FIG. 2 is a schematic view illustrating a speed control apparatus embodying the present invention.

The accelerator pedal 10 when moved in the opposite direction from its neutral position effects de-actuation of the speed governor unit 12 to allow the throttle member 14 to be moved in a throttle closing direction and effects actuation of the brake pedal 13 in a brake applying direction. The accelerator pedal 10 can either be operatively connected with the brake pedal 13 by a mechanical linkage arrangement, as schematically shown in FIG. 2, or by a linkage arrangement which includes a pneumatically actuatable braking servo 17, as shown schematically in FIG. 6.

Figure 3:
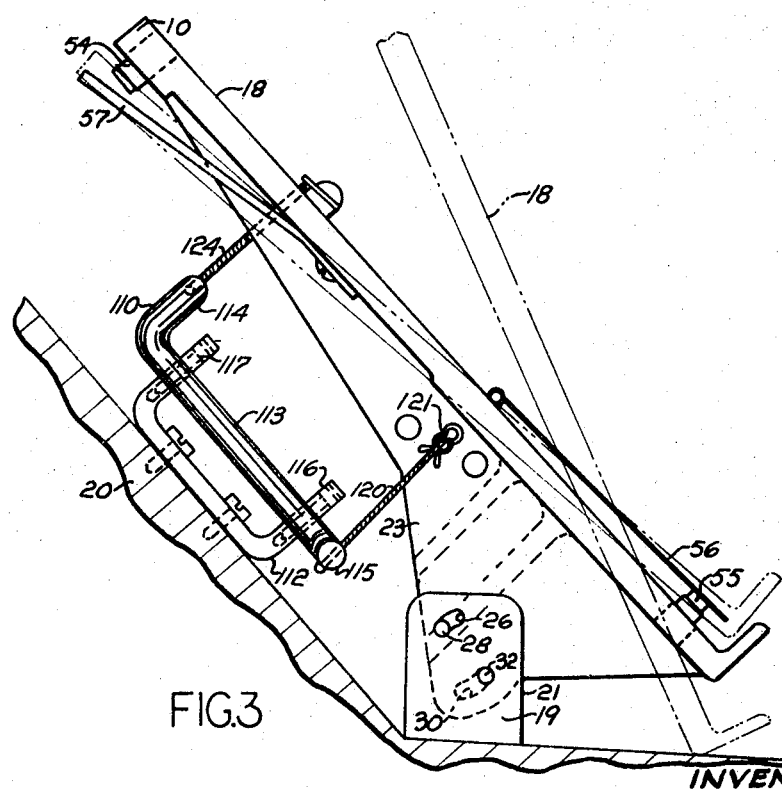
FIG. 3 is an enlarged fragmentary elevational view of part of the apparatus shown in FIG. 2.

Referring to FIG. 3 of the drawings, the accelerator pedal 10 comprises an elongated member having an upper foot engaging surface 18. The accelerator pedal 10 is pivotally connected intermediate its longitudinal ends via a spaced double pivot arrangement to a bracket 19 bolted or otherwise suitably secured to a stationary support, here shown as the floor board 20 of the automotive vehicle A. The bracket 19 is generally U-shaped and has a pair of spaced upwardly extending portions or legs 21 and the accelerator pedal 10 has a pair of laterally spaced downwardly extending portions or legs 23 disposed between the legs 21 of the bracket 19. The legs 21 of the bracket 19 adjacent their upper left corners, as viewed in FIG. 3, are provided with aligned arcuately extending slots 26 which freely receive the opposite ends of a pin 28 fixed to and extending transversely of the legs 23 of the accelerator pedal 10. The downwardly extending legs 23 of the accelerator pedal 10 adjacent their lower end are provided with aligned arcuately extending slots 30 which freely receive a pivot pin 32 extending transversely of and having its opposite ends fixed to the legs 21 of the bracket 19 adjacent their lower right corners. The accelerator pedal 10 is normally disposed in a neutral position, as shown by the full lines in FIG. 3, in which it neither effects actuation of the throttle member 16 nor the brake pedal 13. When the accelerator pedal 10 is in the neutral position the pin 28 is in engagement with the lower end of the slots 26 and the pin 32 is in engagement with the upper end of the slots 30.

The accelerator pedal 10 is movable in opposite directions from the neutral position, as shown by the solid lines in FIG. 3, for selectively effecting an increase in the speed of the vehicle and for applying a braking force to effect a decrease in the speed of the vehicle. Movement of the accelerator pedal 10 to effect an acceleration of the vehicle is accomplished by the depressing of the upper portion of the accelerator pedal from the neutral position toward the floorboard, which direction of movement will hereinafter be referred to as movement of the accelerator pedal 10 in a forward direction. When the accelerator pedal 10 is depressed in a forward direction it pivots about the axis of the pin 28 and with the lower end of the slots 30 moving toward the pin 32. The extent to which the accelerator pedal 10 can be moved in this direction is limited by the extent of the arcuate slots 30, movement in this direction terminating when the lower end of the slots 30 engage the pin 32.

Movement of the accelerator pedal 10 from its neutral position to effect the braking action is accomplished by depressing the lower end of the accelerator pedal toward the floorboard 20, which direction of movement will hereinafter be referred to as movement of the accelerator pedal 10 in a rearward direction. When the accelerator pedal 10 is so moved, it pivots about the axis of the pivot pin 32 with the pivot pin 28 riding within the arcuately extending slots 26. Maximum movement in this direction is limited by the extent of the arcuately extending slots 26.

The accelerator pedal 10 when depressed in a forward direction, as indicated by the direction of the arrow 40 in FIG. 2, actuates a throttle linkage means 41 to effect movement of the throttle member 14 in a throttle opening direction to increase the speed of the engine of the automotive vehicle A. The throttle member 14 is movable from a closed position, as shown in FIG. 2, to a fully open position, as shown by the dotted lines in FIG. 2, in a throttle opening direction for increasing the vehicle speed and is movable in a reverse or throttle closing direction for decreasing the vehicle speed. The throttle member 14 is biased toward its closed position by a spring 42, one end of which is fixed to a suitable support member 43 and the other end of which is fixed to one end of a throttle lever 44. The other end of the throttle lever 44 is rigidly connected with the throttle member 14 with the throttle lever 44 and member 14 being pivotally supported by a pin 45 extending transversely within the carburetor for the engine 15 of the automotive vehicle A. As viewed in FIG. 2, when the throttle lever 44 is moved toward the right, the throttle member 14 is moved in a throttle opening direction and when the throttle lever 44 is moved toward the left the throttle member 44 moves in a throttle closing direction.

The throttle lever 44 is biased by the spring member 42 toward the left to move the throttle member 14 toward its closed position and is moved toward the right to move the throttle member 14 in a throttle opening direction by the throttle linkage means 41 when the accelerator pedal 10 is depressed in a forward direction. The throttle linkage means 41 comprises a cable 48 having one end fixed to the end of the throttle lever 44 remote from the throttle member 14 and the other end connected to one end of a bell-crank lever 50. The bell-crank lever 50 is pivotally connected intermediate its ends to the floorboard 20 of the automotive vehicle A and has its other end disposed beneath the upper end of the accelerator pedal 10 and within the path of movement of the accelerator pedal 10.

From the foregoing, it should be apparent that when the accelerator pedal 10 is depressed in a forward direction, as indicated by the arrow 40, it engages the other end of the bell-crank lever 50 to cause the same to be pivoted about its pivotal connection in the direction of the arrow 52 which in turn causes the throttle cable 48 to be moved in the direction of the arrow 53. Movement of the throttle cable 48 in this direction causes the throttle lever 44 to be moved toward the right in opposition to the biasing force of the spring 42 and the throttle member 14 to be moved in a throttle opening direction to increase the speed of the engine of the automotive vehicle.

Depression of the accelerator pedal 10 in a forward direction also effects a de-actuation of the speed governor unit 12 and movement of the accelerator pedal 10 in a return direction back toward its neutral position effects actuation of the speed governor unit 12 to maintain the speed of the vehicle at or substantially at the highest value attained during the acceleration of the vehicle. To this end, the accelerator pedal 10 on the bottom side of its upper end carries a pressure actuatable microswitch 54 and on the top side of its lower end carries a pressure actuatable microswitch 55, as viewed in FIG. 2. The switch 54 is actuated from a normally closed position to an open position by the bell-crank lever 50 when the accelerator pedal 10 is depressed in a forward direction and engages the bell-crank lever 50. The microswitch 55 is normally open and is adapted to be moved to a closed position by the heel of the operator's foot. To insure actuation of the switch 55, the accelerator pedal 10 carries a heel plate 56 which has one end pivotally connected to the accelerator pedal and which has its free end overlying the microswitch 55. The pressure exerted on the heel plate 56 by the operator's foot causes the switch 55 to be moved from its normaly open position to its closed position.

The switch 54 functions to cause the speed govenor unit 12 to be de-actuated when it is moved to its open position in response to movement of the accelerator pedal 10 in the forward direction and in conjunction with the switch 55 to cause the speed governor unit 12 to be actuated when it and the switch 55 are in closed position. The switch 54 is returned to its normally closed position in which it, in conjunction with the switch 55, functions to actuate the speed governor unit 12, in response to movement of the accelerator pedal 10 in a return direction toward its neutral position by the operator. The manner in which the switch 54 controls de-actuation of the speed governor unit 12 during acceleration of the vehicle A and in which it in conjunction with the switch 55 controls actuation thereof when the desired speed has been attained will hereinafter be more fully described.

Provision is made, however, to insure that the switch 54 is returned to its closed position should the operator remove his foot from the accelerator pedal 10 prior to returning it back to its neutral position. The provision is in the form of a leaf spring 57 having one end fixed to the under side of the accelerator pedal 10 and its other end free and disposed between the switch 54 and the adjacent end of the bell-crank lever 50. The leaf spring 57 has a normal position in which its free end is spaced from the switch 54 when free of any imposed forces. The leaf spring 57 is deflected into engagement with the switch 54 by the lever 50 when the accelerator pedal 10 is depressed in a forward direction. The leaf spring 57 functions to move the accelerator pedal in a return direction toward its neutral position and away from the free end thereof and thus, insures that the switch 54 will return to its normally closed position in the event the operator removes his foot from the accelerator pedal prior to returning to its neutral position.

The speed governor unit 12 for maintaining the speed of the vehicle at or substantially at the highest value attained during the acceleration thereof may be of any suitable type, but is preferably a vacuum speed governor unit like that disclosed in application Ser. No. 453,750, filed Mar. 6, 1965, Patent No. 3,298,482, and assigned to the same assignee as the present invention. Since the speed governor unit 12 does not per se form a part of the present invention, it will not be described in detail, but will only be described to the extent necessary for one skilled in the art to understand its general operation and its operational relationship with the speed control apparatus of the present invention.

As schematically illustrated in FIG. 2, the speed governor unit 12 is operatively connected to the throttle lever 44 at its end remote from the throttle member 14 by means of a flexible chain like member 61. The chain member 61 is trained around suitable pulleys, such as pulley 62, to hold and effect movement of the throttle lever 44 upon actuation of the speed governor unit 12. The speed governor unit 12 includes a housing 63 which defines in part a vacuum chamber 64 and supports a flexible diaphragm 65 which forms a wall of the vacuum chamber 64. The diaphragm 65 is connected to one end of the chain member 61 with the opposite end of the chain 61 being connected with the throttle lever 44. Movement of the flexible diaphragm 65 in the direction of the arrow 66 is in a direction to effect movement of the throttle lever 44 toward the right through the chain connection 61 and consequently movement of the throttle member 14 in a throttle opening direction.

The diaphragm 65 is movable in the direction of the arrow 66 shown in FIG. 2 in response to the creation of a vacuum in the vacuum chamber 64 and is biased to position shown in FIG. 2 by means of a suitable spring 68 and the spring 42. When the vacuum in the chamber 64 and the force applied by springs 42 and 68 are balanced, the diaphragm stops moving and an equilibrium condition is established. When the vacuum is then either increased or decreased, the diaphragm 65 will move and cause a consequent movement of the throttle member 14.

The vacuum in the vacuum chamber 64 is provided through a suitable vacuum connection 70 in the housing 63 which in turn is connected by suitable conduits (not shown) to the intake manifold of the vehicle to supply a vacuum thereat. The chamber 64 also communicates with the atmosphere with a suitable connection 71 preferably spaced slightly from the connection 70 and opposite thereto.

The vacuum in the chamber 64 is controlled by a flapper valve or member 72 which controls the amount of communication between the vacuum and atmospheric connections 70, 71 and the chamber 64. The flapper valve 72 extends between nozzle like opening 73 and 74 respectively connecting the vacuum and atmospheric conduits 70 and 71 with the chamber 64. The flapper valve 72 is movable relative to the nozzle openings 73 and 74 and when positioned adjacent the nozzle opening 73 substantially blocks communication between the vacuum conduit 70 and the vacuum chamber 64 and thus, the chamber 64 is at substantially atmospheric pressure and the diaphragm 65 is in a position shown in FIG. 2. When the flapper valve 72 moves away from the nozzle 73, the vacuum connection 70 then communicates with the chamber 64 and the vacuum is established therein causing the diaphragm member 65 to move in the direction of the arrow 66 shown in FIG. 2. The flapper valve 72 is normally biased so as to be positioned adjacent the nozzle opening 73 to substantially block communication between the vacuum conduit 70 and the vacuum chamber 64 by a compression spring 77.

The speed governor unit 12 includes a speed sensing means 78 which is operatively connected with the drive of the vehicle A. The speed sensing means includes a movable core member 80 slidably received in an opening in the flapper valve 77 and which is moved in accordance with the speed of the vehicle. The speed governor unit 12 further includes a locking mechanism 81 including a selectively energizable coil 82 for moving the flapper valve 72 away from the nozzle 73 in opposition to the biasing force of the spring 77 and for locking the flapper valve 72 and the core member 80 together. When this occurs a vacuum is established in the vacuum chamber 64 which causes the diaphragm 65 to move in a direction of the arrow 66 shown in FIG. 2 and to hold the throttle member 14 in the throttle opening position to which it had been moved during the acceleration of the vehicle. Reference may be had to the aforementioned pending patent application, Ser. No. 453,850 for a detailed description of the speed sensing means 78 and the locking mechanism 81.

When the accelerator pedal 10 is depressed in a forward direction and the switch 54 moved to its open position, the coil 82 is de-energized whereby the flapper valve 72 is positioned adjacent the vacuum nozzle 73 by the spring 77 with the result that the speed governor unit 12 is de-actuated. As the speed of the vehicle is accelerating the speed sensing means senses the speed to cause the core member 80 to be positioned in accordance with the speed of the vehicle. When the accelerator pedal is moved in return direction from its depressed position toward its neutral position the switch 54 is returned to its closed position and the switch 55 moved to its closed position to effect energization of the coil 82 of the locking mechanism 81 which in turn locks the flapper valve 72 to the core 80 to position the flapper valve 72 between the nozzle 73 and 74 so as to create a vacuum in the vacuum chamber which is proportional to the speed sensed by the speed sensing means 78. The vacuum applied to the vacuum chamber 64 effects movement of the diaphragm member 65 in the direction of the arrow 66 until the vacuum force is in equilibrium with the force of the springs 42 and 68 whereupon the flexible member 61 is taut and the throttle member 14 is held in or substantially in the throttle opening position to which it had been moved to maintain the speed of the vehicle at or substantially at the highest value attained during acceleration of the speed of the vehicle.

The accelerator pedal 10 when depressed from its neutral position in a rearward direction, as indicated by the direction of the arrow 88 in FIG. 2, effects a de-actuation of the speed governor unit 12 and actuation of the brake pedal 13 in a brake applying direction to reduce the speed of the vehicle A. De-actuation of the speed governor unit 12 during braking is effected primarily by a control mechanism 90 which functions to immediately vent the vacuum chamber 64 to the atmosphere and thus, render the speed governor unit 12 inoperative to perform any control on the throttle member 14. The control mechanism 90 comprises a suitable or conventional vent valve means 91 which is in communication with the vacuum chamber 64 via a conduit 92. The vent valve means 91 includes a valve member (not shown) which is spring biased to an open position in which it communicates the vacuum chamber 64 to the atmosphere, but which is movable from its open position to a closed position in which it prevents any venting from the vacuum chamber 64 to the atmosphere via conduit 92 upon energization of a solenoid or coil 95 connected therewith.

The control mechanism 90 further includes a suitable or conventional two-position switch 100 for effecting de-energization of the solenoid 95 during braking of the vehicle. The switch 100 is operatively associated with the brake pedal 13 and is movable from a normally closed position, in which position energization of the coil 95 can be effected, and an open position, in which position it functions to cause the solenoid coil 95 to be de-energized which in turn causes the vacuum chamber 64 to be vented to the atmosphere so as to render the speed governor unit 12 inoperative for holding or controlling the position of the throttle member 14, in response to movement of the brake pedal 13 in a brake applying direction. The throttle member 14 when the speed governor unit 12 is vented to the atmosphere returns toward its closed position as a result of the biasing force exerted thereon by the compression spring 42.

Figure 4:
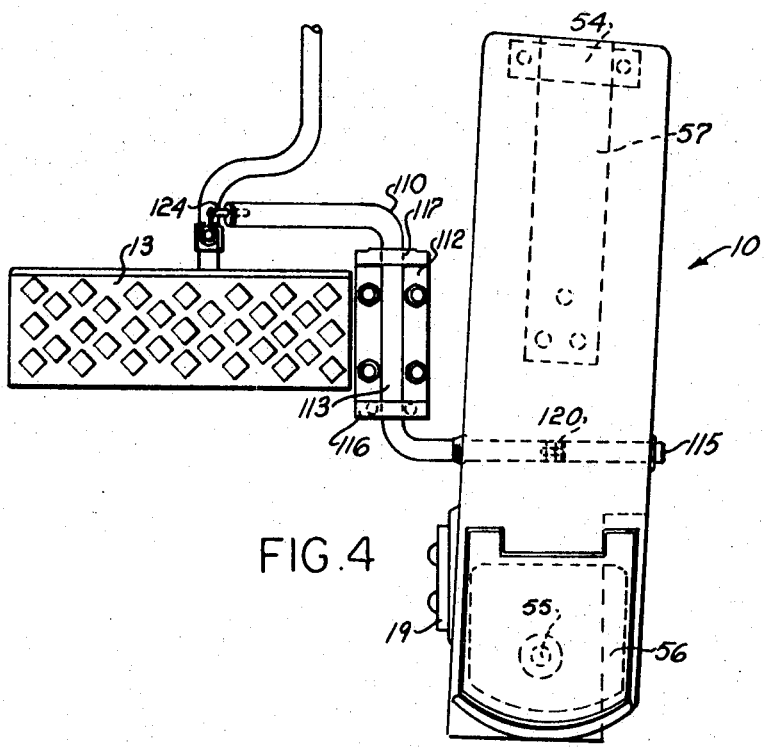
FIG. 4 is a top plan view of that part of the apparatus shown in FIG. 3.
Figure 5:
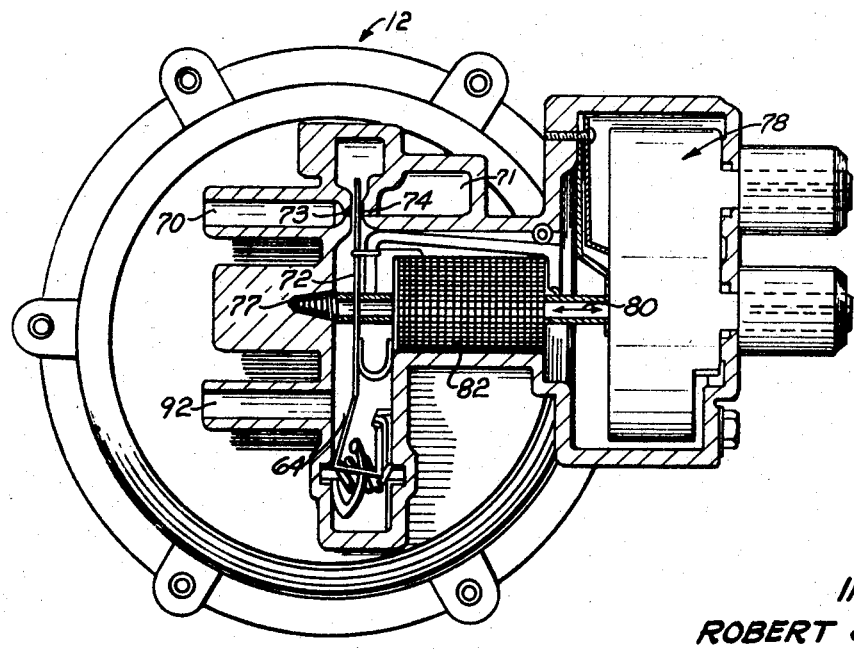
FIG. 5 is a sectional view with portions shown in elevation taken approximately along line 5—5 of FIG. 2.

Actuation of the brake pedal 13 in a brake applying direction to reduce the speed of the vehicle in the speed control apparatus shown in FIG. 2 is effected by a direct mechanical linkage arrangement. Referring to FIGS. 3 and 4, the direct mechanical linkage arrangement includes a lever 110 pivotally supported by a bracket 112 bolted or otherwise secured to the floorboard 20 of the vehicle A for movement in opposite directions about an axis extending generally parallel thereto. The lever 110 has an intermediate portion 113 disposed generally parallel to the accelerator pedal 10 and a pair of oppositely extending end portions 114, 115 which extend generally perpendicular to the intermediate portion 113. The bracket 112 is U-shaped and has a pair of upwardly extending legs 116 and 117 at its opposite ends for rotatably supporting the intermediate portion 113 of the lever 110 adjacent its opposite ends. The end portion 114 is skewed with respect to a plane containing the intermediate portion 113 and the end portion 115. When the accelerator pedal 10 is in its neutral position, as shown by the solid lines in FIG. 3, the intermediate and end portions 113, 115 of the lever 110 are disposed in a plane which is generally parallel to the floorboard 20 and the end portion 114 extends in an upward direction from the floorboard 20 toward the brake pedal 14 and at an acute included angle with respect to the plane containing the end portions 113, 115.

The lever 110 is connected with the accelerator pedal 10 by a flexible cable 120 having one end secured to the end of the end portion 115 remote from the intermediate portion 113 and the other end secured to a pin 121 extending transversely of the accelerator pedal 10 and with its opposite ends being fixed to the legs 23 thereof. The lever 110 is connected with the brake pedal 13 by a flexible cable 124 having one end secured to the end of the end portion 114 remote from the intermediate portion 113 and the other end fixed to the brake pedal 13.

From the foregoing, it should be apparent that when the accelerator pedal 10 is depressed in a rearward direction from its neutral position, as indicated by the direction of the arrow 88, the pin 121 is caused to be moved in a direction away from the floorboard 20 which in turn causes the cable 120 to be moved in a direction away from the floorboard 20. Movement of the cable 120 in this direction causes the end portion 115 of the lever 110 to be moved about the pivotal axis of the latter in a direction away from the floorboard 20 which in turn causes the end portion 114 to be moved in a direction toward the floorboard 20. Movement of the end portion 114 of the lever 110 in this direction causes the brake pedal 13 to be moved from its normal or retracted position in a brake applying direction to actuate the brakes of the vehicle A to reduce the speed of the vehicle A, and in a manner well known to those skilled in the art.

When the speed of the vehicle A has been reduced to the extent desired and/or stopped and the accelerator pedal 10 returned toward its neutral position by the operator, the brake pedal 13 will be returned to its retracted position in a conventional manner, such as by a suitable return spring 129. The brake pedal 13 during its return movement causes the cable 124 and the end portion 114 of the lever 110 to be moved in a direction away from the floorboard 20 which in turn causes the lever 110 to be pivoted in the reverse direction and the end portion 115 thereof to be moved toward the floorboard 20. When the brake pedal has been returned to its retracted position, the lever 110 will have been returned to the position shown in the solid lines of FIG. 3.

Alternately, de-actuation of the speed governor unit 12 and actuation of the brake pedal 13 in a brake applying direction to decrease the speed of the automotive vehicle A may be effected by directly depressing the brake pedal 13 rather than by moving the accelerator pedal 10 in a rearward direction. When the brake pedal 13 is moved in a brake applying direction, the switch 100 is actuated from its normally closed position to an open position to cause the speed governor unit 12 to be rendered inoperative. The switch 100 functions to de-energize the solenoid coil 95, when moved to its open position, to cause the vacuum chamber 64 of the speed governor unit 12 to be vented to the atmosphere, and in a manner which will hereinafter become more fully apparent.

Figure 13:
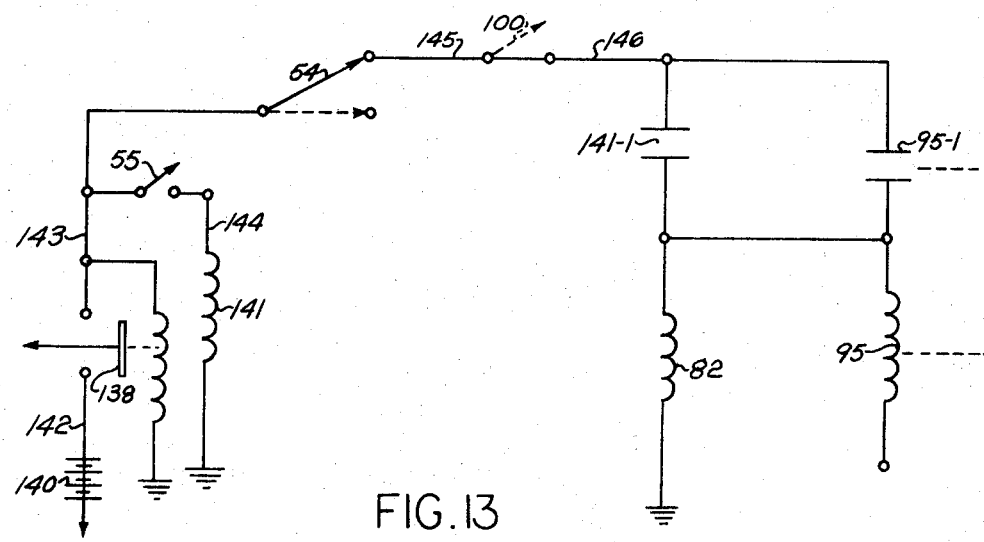
FIG. 13 is a schematic circuit diagram usable with the speed control apparatus shown in FIG. 2.

The operation of the speed control apparatus or system illustrated in FIG. 2 will be more readily understood from a description of an electrical control diagram which may be embodied therein and which is schematically illustrated in FIG. 13. The electrical control diagram illustrated in FIG. 13 includes four switches, namely, an ignition switch 138, the switches 54 and 55 carried by the accelerator pedal 10 and the switch 100 operatively associated with the brake pedal 10.

When it is desired to start the engine of the vehicle A, the operator will move the ignition switch 138 to its closed position and will place his foot on the accelerator pedal 10 which causes the heel switch 55 thereon to be moved from its normally open position to a closed position. The closing of switches 138 and 55 completes a circuit for energizing a relay coil 141. This circuit is from battery 140 through conductor 142, normally open but now closed ignition switch 138, conductor 143, normally open but now closed switch 55, conductor 44, relay 141 to ground. The energization of relay 141 closes normally open contacts 141-1. The closing of normally open contacts 141-1 completes a circuit for energizing the coil 82 for actuating the speed governor unit 12 and a circuit for energizing the coil 95 which closes the vent control valve 91. These circuits are from battery 140 through conductor 142, normally open but now closed ignition switch 138, conductor 143, normally closed switch 54, conductor 145, normally closed switch 100, conductor 146, normally open but now closed contacts 141-1, conductor 147, coil 82 to ground and from conductor 147 through coil 95 to ground. The energization of coil 82 causes the core member 80 to be locked to the flapper valve 72 of the speed control unit 12 and the energization of the coil 95 causes the vent valve 91 to close off the vent to the atmosphere via conduit 92 from the vacuum chamber 64.

When the vehicle operator depresses the accelerator pedal 10 in a forward direction to cause the vehicle A to be moved and the speed thereof increased, the switch 54 is moved from its normally closed position to an open position, as indicated by the dotted lines in FIG. 13. Movement of the switch 54 to its open position breaks the aforementioned circuits containing the coils 82 and 95 to cause the same to be de-energized and the speed governor 12 to be de-actuated. During movement of the accelerator pedal 10 in this direction, the switch 55 will normally be maintained in its closed position due to the fact that the heel of the operator's foot will usually remain in engagement with the heel plate 56 carried by the accelerator pedal 10. However, since the coils 82 and 95 are already de-energized, the opening of contacts 141-1 at this time would produce no function should the relay coil 141 become de-energized as a result of a switch 55 being moved to its open position upon the operator's foot becoming disengaged therefrom during the acceleration of the speed of the vehicle.

When the operator has accelerated the vehicle to the desired speed, he will move the accelerator pedal 10 in a return direction toward its neutral position, which movement will cause the switch 54 to move to its normally closed position and the switch 55, if not already closed, to move toward its closed position, since the heel of the operator's foot will be pressing down on the heel plate 56 during the return movement of the accelerator pedal 10 toward its neutral position. With the switch 55 in its closed position, the aforementioned circuit containing the relay coil 141 is completed and the relay 141 is energized which in turn causes normally open contacts 141-1 to be closed. Movement of the switch 54 to its closed position completes the aforementioned circuits containing coils 82 and 95 to cause the same to be energized. Energization of the locking coil 82 causes the core member 80 to be locked to the flapper valve 72 which in turn causes the speed governor unit 12 to maintain or substantially maintain the throttle member 14 in the position to which it was moved by the depression of the accelerator pedal 10 in a forward direction. Energization of the vent coil 95 causes the vent valve 91 to be moved to a closed position and block venting of the vacuum chamber 64 of the speed governor unit 12 to the atmosphere via conduit 92.

Energization of the vent coil 95 also functions to close normally open contacts 95-1 to complete holding circuits for both the coils 82 and 95. These holding circuits are from battery 140 through conductor 142, now closed ignition switch 138, conductor 143, normally and now closed switch 54, conductor 145, normally closed switch 100, conductor 146, now closed contacts 95-1, conductor 147, coil 82 to ground and from conductor 147 through coil 95 to ground. The provision of the holding circuits for the coils 82 and 95 insures that these coils will remain energized in the event the operator allows the switch 55 to be moved to its open position by manipulation of his foot or in the event he desires to remove his foot from the accelerator pedal 10 when he has attained the desired speed. When the coils 82 and 95 are energized, the speed governor unit 12 is immediately actuated and rendered operative to maintain or substantially maintain the speed of the vehicle A at the highest speed attained during the acceleration thereof.

When a reduction in the speed of the automotive vehicle A is desired, the operator will depress the accelerator pedal 10 in a rearward direction from its neutral position. The depression of the accelerator pedal 10 in a rearward direction causes the lever 110 to immediately move the brake pedal 13 in a brake applying direction from its retracted position. Movement of the brake pedal 13 in a brake applying direction causes normally closed switch 100 to be moved to an open position. Movement of the switch 100 to an open position breaks the aforementioned circuits containing the coils 82 and 95 to cause the same to be de-energized. De-energization of the vent coil 95 opens the valve means 91 so that the vacuum chamber 64 is immediately vented to the atmosphere via conduit 92 whereby the speed governor unit 12 is rendered inoperative. De-actuation of the speed governor unit 12 allows the throttle member 14 to be returned toward its closed position by the spring 42. De-energization of the locking coil 82 unlocks the core 80 from the flapper valve 72 which in turn causes the flapper valve 72 of the speed governor unit 12 to be positioned against the vacuum nozzle 73 by the biasing force of the spring 77 to prevent any further vacuum to be exerted on the vacuum chamber 64.

From the foregoing, it should be apparent that as soon as the brake pedal 13 begins to move in a brake applying direction the speed governor unit 12 is immediately de-actuated as a result of the vacuum chamber 64 thereof being immediately vented to the atmosphere. The extent of the braking force applied is dependent upon the extent of the movement of the accelerator pedal 10 in a rearward direction.

If the brake pedal 14 itself is depressed in a brake applying direction rather than the accelerator pedal 10 being moved in a rearward direction to effect a braking of the vehicle, the braking switch 100 will be moved from its normally closed position to an open position to effect de-actuation of the speed governor unit 12 and in the manner explained above.

Figure 6:
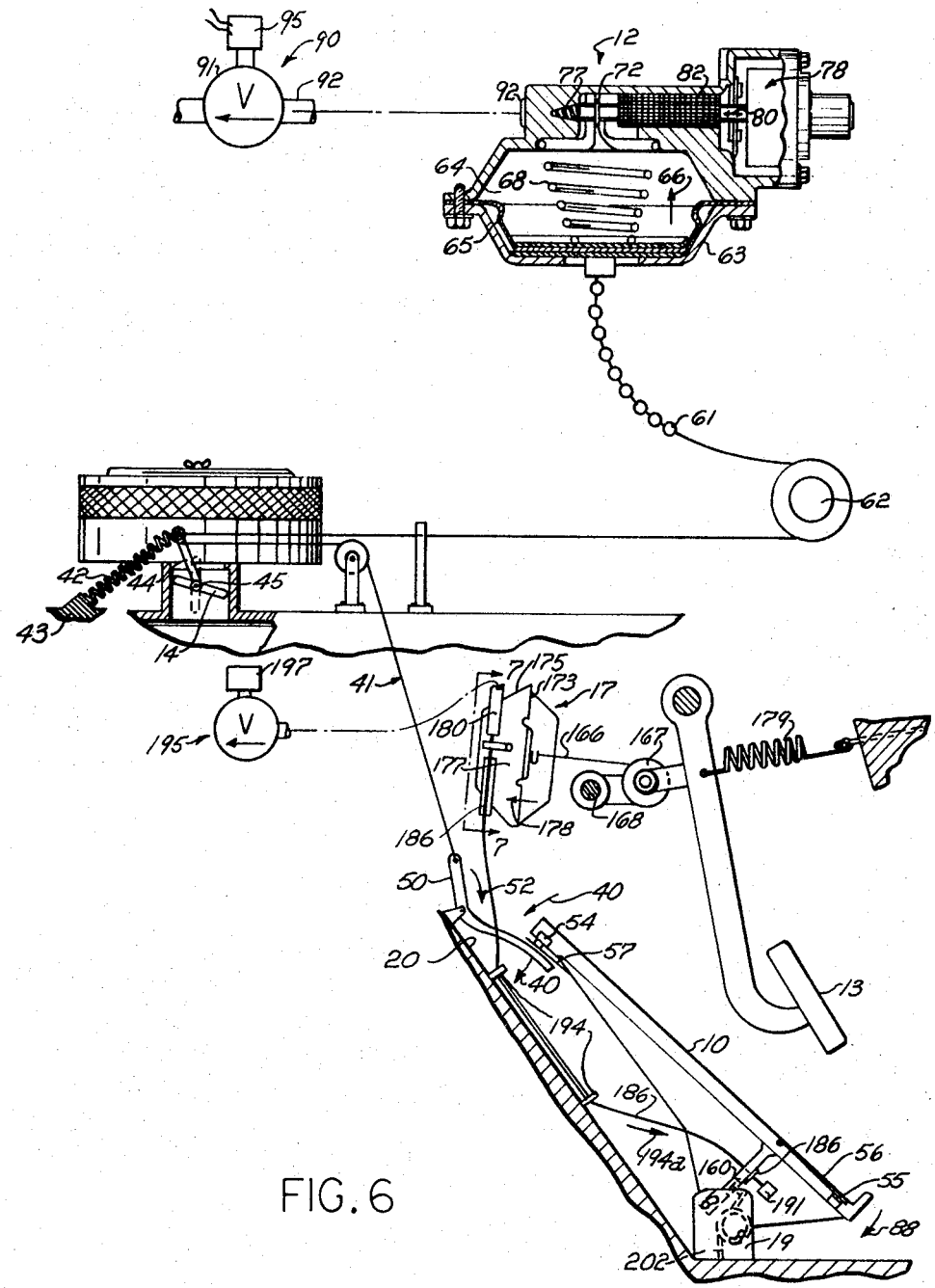
FIG. 6 is a schematic view illustrating another speed control apparatus embodying the present invention.

FIG. 6 schematically illustrates an alternate speed control apparatus which may be employed in place of the speed control apparatus shown in FIG. 2. The speed control apparatus shown in FIG. 6 is of an identical construction to the speed control apparatus shown in FIG. 2 except that a different linkage arrangement is employed for actuating the brake pedal 13 when the accelerator pedal 10 is depressed in a rearward direction and an additional braking switch 160 carried by the accelerator pedal 10 is provided, and parts thereof which are identical to corresponding parts of the speed control apparatus shown in FIG. 2 will be given the same reference numerals. The linkage arrangement for actuating the brake pedal 13 includes a vacuum actuated braking servo 17 which is operatively connected to the brake pedal 13 by means of a flexible cable 166. The flexible cable is trained around a pulley 167 rotatably supported by the brake pedal 14 and is adapted to effect movement of the brake pedal 13 in a brake applying direction upon actuation of the braking servo 17. The cable 166 has one end fixed to a fixed support 168 and the other end connected to a metal plate as by a clip 171 (see FIG. 9) which in turn is suitably fixed to a movable and flexible diaphragm 173 supported within a servo housing 175. The servo housing 175 defines in part a vacuum chamber 177 with the diaphragm 173 forming a wall of the vacuum chamber 177. Movement of the flexible diaphragm 173 in the direction of the arrow 178 shown in FIG. 6 is in the direction to effect movement of the brake pedal 13 in a brake applying direction through the cable 166.

The diaphragm 173 is a resilient member and is normally disposed in the position shown in FIG. 8. The diaphragm 173 is movable in the direction of the arrow 178 shown in FIGS. 6 or 8 to cause the brake pedal 13 to be moved in a brake applying direction in response to the creation of the vacuum in the vacuum chamber 177. When the vacuum chamber 177 is not placed under a vacuum, the brake pedal 13 is adapted to be returned to its retracted position in a conventional manner, such as by a spring 179.

A vacuum in the vacuum chamber 177 is provided through a suitable vacuum connection 180 in the servo housing 175 which is connected by a suitable conduit (not shown) to a suitable vacuum source, such as the intake manifold of the vehicle, to supply a vacuum thereat. The chamber 177 also communicates with the atmosphere through a suitable connection 181 preferably spaced slightly from the connection 180 and opposite thereto.

The vacuum in the chamber 177 is controlled by a flapper valve or member 182, the operation of which will be described in detail hereinbelow, but which, in general, controls the amount of communication between the vacuum connection 180 and the atmospheric connection 181 and the chamber 177. The flapper valve 182 is an elongated member which extends between nozzle like openings 183 and 184 connecting the vacuum and atmospheric connections 180 and 181 with chamber 177. The flapper member 182 is movable relative to the nozzle openings 183 and 184 and when positioned adjacent the nozzle opening 183 substantially blocks communication between the vacuum conduit 180 and the vacuum chamber 177, and the chamber 177 thus is at or susbtantially at atmospheric pressure and the diaphragm 173 in the position shown in FIG. 8. When the flapper valve 182 is moved away from the nozzle 183, as shown in FIG. 10, the vacuum connection 180 is placed in communication with the chamber 177 and a vacuum is established therein causing the diaphragm member 177 to move in the direction of the arrow 178 shown in FIG. 8 to effect movement of the brake pedal 13 in a brake applying direction.

The flapper member 182 specifically is a flat strip metallic member which extends between the adjacent nozzles 183 and 184, and which is normally biased by a compression spring 185 into engagement with the nozzle 183, thereby blocking communication between the vacuum connection 180 and the vacuum chamber 177. The spring 185 surrounds and is carried by a pin 185a fixed to the housing 175 and which is slidably received in a through opening in the flapper valve 182. The spring 185 has one end in abutting engagement with the housing 175 and the other end with abutting engagement with the flapper valve 182 to cause the latter to be biased into engagement with the nozzle 183.

The flapper valve 182 is movable from the nozzle 183 toward the nozzle 184 and in opposition to the biasing forces of the spring 185 to place the chamber 177 in communication with the vacuum connection 180 to effect movement of the diaphragm 173 in a brake applying direction, as indicated by the direction of the arrow 178, in response to movement of the accelerator pedal 10 in a rearward direction from its neutral position. The extent of the vacuum established in the chamber 177 is in accordance with the amount of movement of the flapper valve 182 toward the nozzle 184 which in turn is dependent upon the extent of movement of the accelerator pedal 10 in the rearward direction. Movement of the flapper valve 182 in a direction toward the nozzle 184 is effected by a cable 186 having one end connected with the flapper valve 182 and the other end operatively connected with an adjustably positionable member 187 slidably carried within a vertically extending guide channel 189 in a wall 190 extending transversely between the legs 23 of the accelerator pedal 10. The cable 186 freely extends through a through opening in the member 187 to permit relative movement therebetween when the pedal 10 is moved in a forward direction. The cable 186 carries a member 191 which is adapted to be abuttingly engaged by the member 187 carried by the pedal 10 when the latter is moved in the rearward direction. The cable movement is guided at the housing 175 by a shroud 193 fixed to the housing 175 and adjacent the accelerator pedal 10 by any suitable means, such as by bushings 194 fixed to the floorboard 20 of the vehicle A. The member 187 is adjustably positionable in a vertical direction within the guide channel 189 as by a screw 192 so as to enable the cable 186 to be readily adjusted to a taut condition.

From the foregoing, it should be apparent that when the accelerator pedal 10 is depressed in a rearward direction the member 187 carried by the pedal 10 engages the member 191 to cause the latter and hence, the cable 186 to be moved in the direction of the arrow 194a shown in FIG. 6. Movement of the cable 190 in this direction effects movement of the flapper valve 182 in opposition to the biasing force of the spring 185 in a direction away from the nozzle 183 and toward the nozzle 184. Movement of the flapper valve 182 in this direction lessens the atmospheric vent and causes the vacuum chamber 177 to be placed in communication with the vacuum connection 180 to cause the same to be evacuated in proportion to the amount of braking effort being applied. Creation of a vacuum in a chamber 177 causes the diaphragm 173 to move in the direction of the arrow 178 which in turn causes the cable 166 to move the brake pedal 14 in a brake applying direction. When the accelerator pedal 10 is moved in a return direction opposite to its brake applying direction toward its neutral position, the cable 186 is no longer held taut and the spring 185 moves the flapper valve 183 toward and into engagement with the nozzle 183 of the vacuum connection 180. This increases the atmospheric vent and allows the diaphragm to return into its normal position, as shown in FIG. 6 or 8 and enables the spring 179 operatively associated with the brake pedal 13 to return the same toward its retracted position.

A suitable or conventional control valve means 195 is provided for selectively communicating the vacuum conduit 180 either to the vacuum source or to the atmosphere. The control valve means 195 is spring biased toward a first position in which it communicates the connection 180 with the atmosphere and is movable from its first position to a second position in which it communicates the connection 180 to the vacuum source by energizing a solenoid coil 197. Energization and de-energization of the solenoid coil 197 is controlled by the pressure responsive braking switch 160 carried by the transverse wall 190 of the accelerator pedal 10.

The switch 160 is actuatable between a first position in which it effects de-energization of the solenoid coil 197 and a second position in which it effects energization of the solenoid coil 197 in response to movement of the accelerator pedal 10 in a rearward direction from its neutral position. To this end, a coil spring 202 carried by and surrounding the pivot pin 28 and which has one end fixed to the bottom or base of the bracket 19 the other end in abutting engagement with the switch 160 carried by transverse wall 190 of the accelerator pedal 10 is provided.

The braking servo 17 includes a mechanical feedback means or mechanism 210 which senses the severity of the braking action and effects positioning of the flapper valve 182 in accordance with the position of the diaphragm 173. The feedback means 210 functions to move the flapper valve 182 relative to the pin 185a and the nozzle 184 to increase and decrease the atmospheric vent in accordance with the position of the diaphragm 173.

The feedback mechanism 210 which is connected between the diaphragm 173 and the flapper valve 182 includes a suitable lever member 220 formed of a length of wire-like material. The lever member 220 has one end 221 thereof riding on or in engagement with the diaphragm member 173 and the other end 223 thereof is coiled and pivotable about a pin member 222 fixed to the housing 175. The end 223 of the lever member 220 which is wound about the pin member 222 has a cam portion 224 which extends through an opening in the flapper valve 182 at its end remote from the end positioned adjacent the nozzles 183 and 184.

A suitable spring member 230 encircles a portion of the lever member 220 and bears against the housing 175 of the braking servo 17 and biases the end 221 of the lever member 220 against the diaphragm member 173. When the diaphragm 173 moves in a direction of the arrow 178 shown in FIG. 6, which is the brake applying direction, the lever 220 moves and pivots about the pin member 222, and the cam portion 223 of the member 220 moves through the opening in the flapper valve 182. During the movement of the cam portion 223 through the opening in the flapper valve member 182, the flapper valve 182 is caused to be moved relative to the pin 185a and away from the nozzle 184 to uncover a progressively larger area of the nozzle so as to increase the atmospheric vent.

From the foregoing it should be apparent that the feedback mechanism 210 functions to prevent an over actuation of the brake pedal and over application of the brakes of the vehicle A by increasing the atmospheric vent when the diaphragm 173 has been displaced a predetermined extent. The feedback mechanism 210 prevents over application of the brakes due to operator error in depressing the accelerator pedal 10 in a rearward direction to effect application of the brake pedal 13 and thus, prevents locking of the wheels of the vehicle inadvertently and requiring the operator to hold the accelerator pedal 10 in the braking position for a certain length of time.

Figure 14:
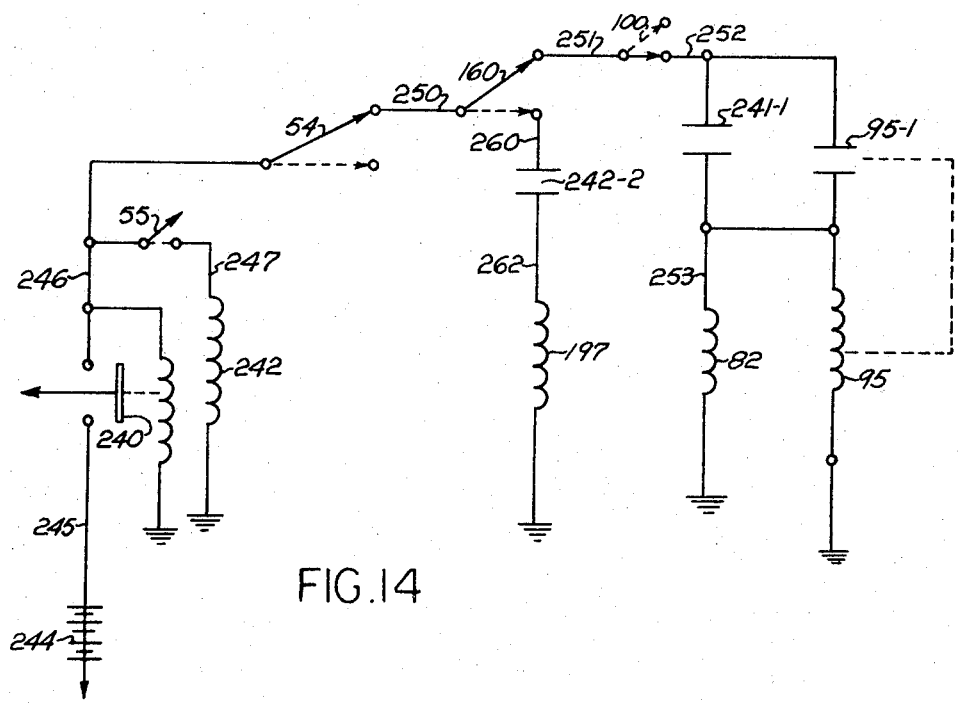
FIG. 14 is a schematic circuit diagram usable with the speed control apparatus shown in FIG. 6.

The operation of the speed control apparatus or system illustrated in FIG. 6 will be more readily understood from a description of an electrical control diagram which may be embodied therein and which is schematically illustrated in FIG. 14. The electrical control diagram illustrated in FIG. 14 includes five switches, namely an ignition switch 240, the switches 54 and 55 carried by the accelerator pedal 10, the switch 100 operatively associated with the brake pedal 13, and the braking switch 160 operatively connetced with the accelerator pedal 10 and which controls energization of the coil 197 of the braking servo 17.

When it is desired to start the engine of the vehicle A, the operator will move the ignition switch 240 to its closed position and will place his foot on the accelerator pedal 10 which causes the switch 55 to be moved from its normally open position to a closed position. The closing of switches 240 and 55 completes a circuit for energizing a relay coil 242. This circuit is from battery 244 through conductor 245, now closed the ignition switch 240, conduct 246, normally open but now closed switch 55, conductor 247, relay coil 242 to ground. The energization of relay coil 242 closes normally open contacts 241-1 and 242-2. The closing of normally open contacts 242-1 completes a pair of circuits for energizing the coils 82 and 95. These circuits are from battery 244 through conductor 245, now closed ignition switch 240, conductor 246, normally closed switch 54, conductor 250, normally closed switch 160, conductor 251, normally closed switch 100, conductor 252, normally open but now closed contacts 242-1, conductor 253, coil 82 to ground and from conductor 253 through coil 95 to ground. The energization of coil 82 causes the core member 80 to be locked to the flapper valve 72 of the speed control unit 12 and the energization of the coil 95 causes the vent valve 91 to close off the vent to the atmosphere via conduit 92 from the vacuum chamber 64. The closing of contacts 242-2 provides no present function.

When the vehicle operator depresses the accelerator pedal 10 in a forward direction to cause the vehicle A and the speed thereof to be increased, the switch 54 is moved from its normally closed position to an open position, as indicated by the dotted lines in FIG. 14. Movement of the switch 54 to its open position breaks the aforementioned circuit containing the coils 82 and 95 to cause the same to be de-energized and the speed governor 12 to be de-actuated. The switch 55 will normally be maintained in its closed position due to the fact that the heel of the operator's foot will usually remain in engagement with the heel plate 56 carried by the accelerator pedal 10. However, since the coils 82 and 95 are already de-energized, the opening of contacts 242-1 would produce no present function should the relay coil 242 become de-energized as a result of the switch being moved to its open position by the operator's foot being disengaged from the heel plate 56 during acceleration of the speed of the vehicle.

When the operator has accelerated the vehicle to the desired speed, he will move the accelerator pedal 10 in a return direction toward its neutral position, which movement will cause the switch 54 to move to its normally closed position and switch 55, if not already closed, to move toward its closed position, since the heel of the operator's foot will be pressing down on the heel plate 56 during the return movement of the accelerator pedal 10 toward its neutral position. With the switch 55 in its closed position, the aforementioned circuit containing the relay coil 242 is completed and the latter is energized so that normally open contacts 242–1 and 242–2 are now closed. Movement of the switch 54 to its closed position completes the aforementioned circuits containing coils 82 and 95. Energization of the coils 82 and 95 actuates the speed governor unit 12 to maintain the speed of the vehicle at the desired level by respectively causing the core member 80 and flapper valve 72 to be locked together and the vent valve 91 to be moved to its closed position.

Energization of the vent coil 95 also functions to close normally open contacts 95–1 to complete holding circuits for both the coils 82 and 95. These holding circuits are from battery 244 through conductor 245, ignition switch 240, conductor 246, normally and now closed switch 54, conductor 250, normally closed switch 160, conductor 251, normally closed switch 100, conductor 252, now closed contacts 95–1, conductor 253, vent coil 82 to ground and from conductor 253 through vent coil 95 to ground. The provision of these holding circuits for the coils 82 and 95 insures that these coils will remain energized in the event that the operator allows the switch 55 to be moved to its open position either by manipulation of his foot or by movement of the foot from the acceleration pedal 10 upon obtaining the desired speed. When the coils 82 and 95 are energized, the speed governor unit 12 is immediately actuated and functions to maintain or substantially maintain the speed of the vehicle A at or substantially at the highest speed attained during the acceleration thereof.

When a reduction in the speed of the automotive vehicle A is desired, the operator will depress the accelerator pedal 10 in a rearward direction from its neutral position. The depression of the accelerator pedal 10 in a rearward direction causes the switch 160 to move from the position shown in the solid lines in FIG. 14 to the position shown in the dotted lines in FIG. 14. Movement of the switch 160 to its dotted lines position breaks the aforementioned circuits containing the coils 82 and 95 and causes the same to be de-energized and hence the speed governor unit 12 to be de-actuated and immediately rendered inoperative. Movement of the switch 160 to its dotted line position completes a circuit for energizing the solenoid coil 197 which in turn moves the valve means 195 to its second position in which it communicates the vacuum chamber 177 with the vacuum source to cause the diaphragm 173 to be moved in a direction of the arrow 178 and hence the brake pedal 13 to be moved in the brake applying direction to reduce the speed of the vehicle A. This circuit is from battery 244 through conductor 245, ignition switch 240, conductor 246, switch 54, conductor 250, switch 160, conductor 260, normally open but now closed contacts 242–2, conductor 262, solenoid coil 197 to ground.

When the speed of the vehicle has been reduced to the level desired, the pedal 10 is returned toward its neutral position by the operator which in turn causes the switch 160 to be moved to its solid line position shown in FIG. 13. Movement of the switch to this position causes the circuit containing the coil 197 to be de-energized. De-energization of coil 197 communicates the vacuum chamber 177 of the breaking servo 17 with the atmosphere to render the latter ineffective to apply any braking action and completes the circuits containing coils 82 and 95 to re-energize the same which in turn causes the speed governor unit 12 to be re-actuated to render the same effective to control the speed at or substantiallyy at the reduced value obtained by braking.

A reduction in the speed of the vehicle and/or stoppage of the vehicle can also be obtained by directly depressing the brake pedal 13 in a brake applying direction rather than moving the accelerator pedal in a rearward direction. Depression of the brake pedal 13 in a brake applying direction would move switch 100 to its open position and break the circuits for coils 82 and 95 and thus, render the speed governor unit 12 inoperative to control the speed of the vehicle.

From the foregoing description of the illustrated embodiment of the present invention, it will be apparent that the objects heretofore enumerated and others have been accomplished in that a new and improved speed control apparatus has been provided. Also from the above description, it should be readily apparent that the speed control apparatus in modifications thereof embodying the present invention have been described in considerable detail and in certain changes, modifications, and adaptations may be made therein by those skilled in the art which it relates, and it is hereby intended to cover all such changes, modifications and adaptations which come within the scope of the appended claims.

Having thus described my invention, I claim:

1. A speed control apparatus for moving an engine throttle member movable in opposite directions between closed and open positions to control engine speed comprising an actuating member movable in opposite directions, means operatively connecting the actuating member to the throttle member and effectively to move the throttle member in a throttle opening direction to increase the engine speed when said actuating member is moved in a first direction, a speed governor unit operatively connected with the throttle member and operable to maintain the engine speed at substantially a desired value when actuated, and means responsive to movement of the actuating member in a second direction opposite to said first direction for actuating the speed governor unit.

2. A speed control apparatus, as defined in claim 1, and wherein said speed governor unit is operable to maintain the engine speed at substantially the highest value attained as a result of the movement of the actuating member in said first direction.

3. A speed control apparatus, as defined in claim 1, and wherein said means for actuating the speed governor unit is also effective to de-actuate the speed governor unit in response to movement of the actuating member in said first direction.

4. A speed control apparatus, as defined in claim 3, and wherein said actuating member is an accelerator pedal, and wherein said means for actuating said speed governor unit includes a two position switch carried by the accelerator pedal and which is engageable with said means for operatively connecting the accelerator pedal to the throttle member, said switch being moved to a first position in which it is effective to render the speed governor unit inoperative when said accelerator is moved in said first direction and being movable to a second position in which it effects actuation of the speed governor unit when said accelerator pedal is moved in said second direction.

5. A speed control apparatus for a vehicle for moving an engine throttle member movable in opposite directions between closed and open positions and for moving a brake actuator movable in opposite directions between retracted and brake applying positions to control the speed of the vehicle comprising an actuating member movable in opposite direction from a first position, means operatively connecting the actuating member to the throttle member and effective to move the throttle member in a throttle opening direction to increase the engine speed of the vehicle when said actuating member is moved in a first direction from said first position, a speed governor unit operatively connected with the throttle member and operable to maintain the engine speed at substantially a desired value when actuated, means operatively connecting the actuating member and the brake actuator and effective to move the brake actuator in a brake applying direction to reduce the engine speed when said actuating member is moved in a second direction opposite to said first direction from said first position, and means responsive to movement of said actuating member in said second direction from said first position to deactuate the speed governor unit and render it inoperative.

6. A speed control apparatus, as defined in claim 5, and including means responsive to movement of the actuating member in a direction opposite to said first direction for actuating the speed governor unit.

7. A speed control apparatus, as defined in claim 6, and wherein said actuating member is an accelerator pedal, and including means for pivotally supporting said accelerator pedal at a pair of spaced longitudinal locations for movement about spaced axes extending transversely thereof, said accelerator pedal pivoting about one of said axes when moved in said first direction from said first position and pivoting about the other of said axes when moving in said second direction from said first position.

8. A speed control apparatus, as defined in claim 6, and wherein said speed governor unit is operable to maintain the engine speed at substantially the highest value attained as a result of the movement of the actuating member in said first direction from said first position.

9. A speed control apparatus, as defined in claim 6, and wherein said means for operatively connecting the actuating member and the brake actuator comprises a lever pivotally supported intermediate its opposite ends for movement in opposite directions, a flexible linkage means connected at its opposite ends with said actuating member and one end of said lever, and a second linkage means connected at its opposite ends with said brake actuator in the other end of said lever.

10. A speed control apparatus, as defined in claim 6, and wherein said means for operatively connecting the actuating member and the brake actuator includes an actuating element operatively connected with the brake actuator and movable in opposite directions, said actuating element when moved in one direction effecting movement of the brake actuator in a brake applying direction, vacuum chamber means on one side of said actuating element, valve means for controlling the degree of vacuum in said vacuum chamber to effect movement of said actuating element in said one direction including a valve member associated with a vacuum conduit and movable from a first position relative thereto to progressively increase communication between the vacuum chamber and the vacuum conduit, and means for moving said valve member to progressively increase the communication between the vacuum chamber and the vacuum conduit in response to movement of said actuating member in said second direction from said first position.

11. A speed control apparatus, as defined in claim 10, and including a vent conduit operatively associated with said valve member for communicating said vacuum chamber with the atmosphere, and a feedback means operatively connected with said actuating element and said valve member and operable to move said valve member to progressively increase the communication between said vacuum chamber and the atmosphere to decrease the vacuum pressure in said vacuum chamber as said actuating element moves in said first direction whereby the vacuum pressure is said vacuum chamber is controlled and movement of said actuating element in said first direction is limited.

12. A vehicle speed control apparatus for moving an engine throttle member movable in opposite directions between closed and open positions and for moving a brake pedal movable in opposite directions between retracted and brake applying positions comprising an accelerator pedal movable in opposite directions from a neutral position, first means operatively connecting the accelerator pedal to the throttle member and effective to move the throttle member in a throttle opening direction to increase the engine speed of the vehicle when said accelerator pedal is moved in a first direction from said neutral position, second means including flexible linkage means operatively connecting the accelerator pedal and the brake pedal and effective to move the brake pedal in a brake applying direction to reduce the engine speed when the accelerator pedal is moved in a second direction opposite to said first direction from said neutral position, said second means including an actuating member operatively connected with said brake pedal and movable in one direction to effect movement of the brake pedal in a brake applying direction, vacuum chamber means on one side of said actuating member, valve means for controlling the degree of vacuum in said vacuum chamber to effect movement of said actuating member in said one direction including a valve member associated with a vacuum conduit and movable from a first position relative to said vacuum conduit to progressively increase communication between the vacuum chamber and the vacuum conduit, means for moving said valve member to progressively increase the communication between said vacuum chamber and conduit in response to movement of said accelerator pedal in said second direction from said neutral position, a vent conduit operatively associated with said valve member for communicating said vacuum chamber with the atmosphere, and a feedback means operatively connected with said actuating member and said valve member and operable to move said valve member to progressively increase the communication between said vacuum chamber and the atmosphere to decrease the vacuum pressure in said vacuum chamber as said actuating member moves in said first direction whereby the vacuum pressure in said vacuum chamber is controlled and movement of said actuating member in said first direction is limited.

13. A speed control apparatus, as defined in claim 12, and wherein said vacuum and vent conduits have aligned opposed openings and including means for supporting said valve member for movement toward and from said openings, said feedback means effecting movement of said valve member between said openings.

14. A speed control apparatus, as defined in claim 13, and wherein said feedback means includes a member biased into engagement with said actuating member and having a cam portion engageable with a portion of said valve member to move said valve member between said openings in response to movement thereof when said actuating member is moved in said one direction.

15. A speed control apparatus, as defined in claim 14, and wherein said feedback member is supported for pivotal movement and is a wire-like member having a portion biased into engagement with said actuating member and a portion pivotal about a pin member and wherein said cam portion comprises a portion extending through an opening in the valve member.

16. A vehicle speed control apparatus for moving an engine throttle member movable in opposite directions between closed and open positions and for moving a brake pedal movable in opposite directions between retracted and brake applying positions comprising an accelerator pedal movable in opposite directions from a neutral position, first means operatively connecting the accelerator pedal to the throttle member and effective to move the throttle member in a throttle opening direction to increase the engine speed of the vehicle when said accelerator pedal is moved in a first direction from said neutral position, and second means operatively connecting the accelerator pedal and the brake pedal and effective to move the brake pedal in a brake applying direction to reduce the engine speed when the accelerator pedal is moved in a second direction opposite to said first direction from said neutral position, said second means comprising a lever pivotally supported intermediate its opposite ends for movement in opposite directions, a first flexible cable means connected with said accelerator pedal and one end of said lever and a second flexible cable means connected with said brake pedal and the other end of said lever.

References Cited

UNITED STATES PATENTS

| | | | |
|---|---|---|---|
| 1,992,644 | 2/1935 | Watson | 192—3 |
| 2,064,612 | 12/1936 | Kliesrath et al. | 192—3 |
| 2,556,485 | 6/1951 | Robnett | 192—3 |
| 2,620,050 | 12/1952 | Menard | 192—3 |
| 2,640,372 | 6/1953 | Dodge | 192—3 |
| 2,657,777 | 11/1953 | Smith | 192—3 |
| 2,814,370 | 11/1957 | Crimi | 192—3 |
| 3,243,022 | 3/1966 | Humphrey | 192—3 |

BENJAMIN W. WYCHE III, *Primary Examiner.*

U.S. Cl. X.R.

123—28; 180—105